(12) United States Patent
Jung et al.

(10) Patent No.: US 11,732,867 B2
(45) Date of Patent: Aug. 22, 2023

(54) AXIAL ORIENTATION OF LEDS

(71) Applicant: ARRIS Enterprises LLC, Suwanee, GA (US)

(72) Inventors: Thomas A. Jung, San Diego, CA (US); Wayne Weeks, Cardiff-by-the-Sea, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/736,332

(22) Filed: Jan. 7, 2020

(65) Prior Publication Data

US 2020/0217479 A1 Jul. 9, 2020

Related U.S. Application Data

(60) Provisional application No. 62/789,183, filed on Jan. 7, 2019.

(51) Int. Cl.
| | | |
|---|---|---|
| *F21V 3/02* | (2006.01) | |
| *F21V 29/83* | (2015.01) | |
| *F21Y 103/33* | (2016.01) | |
| *F21Y 115/10* | (2016.01) | |

(52) U.S. Cl.
CPC .............. *F21V 3/02* (2013.01); *F21V 29/83* (2015.01); *F21Y 2103/33* (2016.08); *F21Y 2115/10* (2016.08)

(58) Field of Classification Search
CPC ...... F21S 43/235; F21S 43/236; F21S 43/237; F21S 43/241; F21S 43/247; F21S 43/249; F21S 10/005; F21S 41/24; F21Y 2103/33; F21V 29/83
See application file for complete search history.

(56) References Cited

U.S. PATENT DOCUMENTS

| | | | | |
|---|---|---|---|---|
| 7,287,876 B2* | 10/2007 | Lin | ......................... | F21V 23/02 362/260 |
| 2007/0217217 A1* | 9/2007 | Chon | ..................... | G02B 6/001 362/555 |
| 2012/0224360 A1* | 9/2012 | Lee | ....................... | F21V 23/009 362/191 |
| 2014/0036522 A1* | 2/2014 | Nakada | ................. | F21S 43/237 362/511 |
| 2016/0025274 A1* | 1/2016 | Bukkems | .............. | F21V 7/0016 362/375 |
| 2019/0039513 A1* | 2/2019 | Mueller | .................. | F21S 43/14 |

* cited by examiner

*Primary Examiner* — Julie A Bannan
(74) *Attorney, Agent, or Firm* — Wenderoth, Lind & Ponack, L.L.P.

(57) ABSTRACT

Methods, systems, and computer readable media can be operable to facilitate an improved positioning of one of more LEDs on a device. A CPE (customer premise equipment) device may include a three-component subassembly composed of an LED module, light tube, and lightguide to allow for uniform lighting with design flexibility. The modularity of the design allows for decoupling from the PCB and reduces the design constraints.

4 Claims, 5 Drawing Sheets

AXIAL ORIENTATION OF LEDS

CROSS REFERENCE TO RELATED APPLICATION

This application is a non-provisional application claiming the benefit of U.S. Provisional Application Ser. No. 62/789,183, entitled "Axial Orientation of LEDs," which was filed on Jan. 7, 2019, and is incorporated herein by reference in its entirety.

TECHNICAL FIELD

This disclosure relates to an axial orientation of LEDs.

BACKGROUND

Cable modems, gateways, extenders, and other devices typically use multiple individual LEDs (light emitting diodes) to provide user feedback regarding functionality. The LED placement in these cases is limited to the placement on the PCB (printed circuit board), which constrains design flexibility. More specifically, the PCB orientation is limited in options in sizing and optimal airflow for thermal management.

LEDs placed directly on a PCB can limit the PCB shape and prevent sufficient airflow to aid in thermal management. Additionally, a PCB may need to be routed in a special custom shape to allow for assembly or add complexity to the housing. Furthermore, a large number of LEDs (e.g., 8 or more) may be needed to provide a required brightness and uniformity.

Therefore, it is desirable to improve upon methods and systems for positioning one or more LEDs on a device.

BRIEF DESCRIPTION OF THE DRAWINGS

Like reference numbers and designations in the various drawings indicate like elements.

DETAILED DESCRIPTION

It is desirable to improve upon methods and systems for positioning one or more LEDs on a device. Methods, systems, and computer readable media can be operable to facilitate an improved positioning of one of more LEDs on a device. A CPE (customer premise equipment) device may include a three-component subassembly composed of an LED module, light tube, and lightguide to allow for uniform lighting with design flexibility. The modularity of the design allows for decoupling from the PCB and reduces the design constraints.

Figure 1:
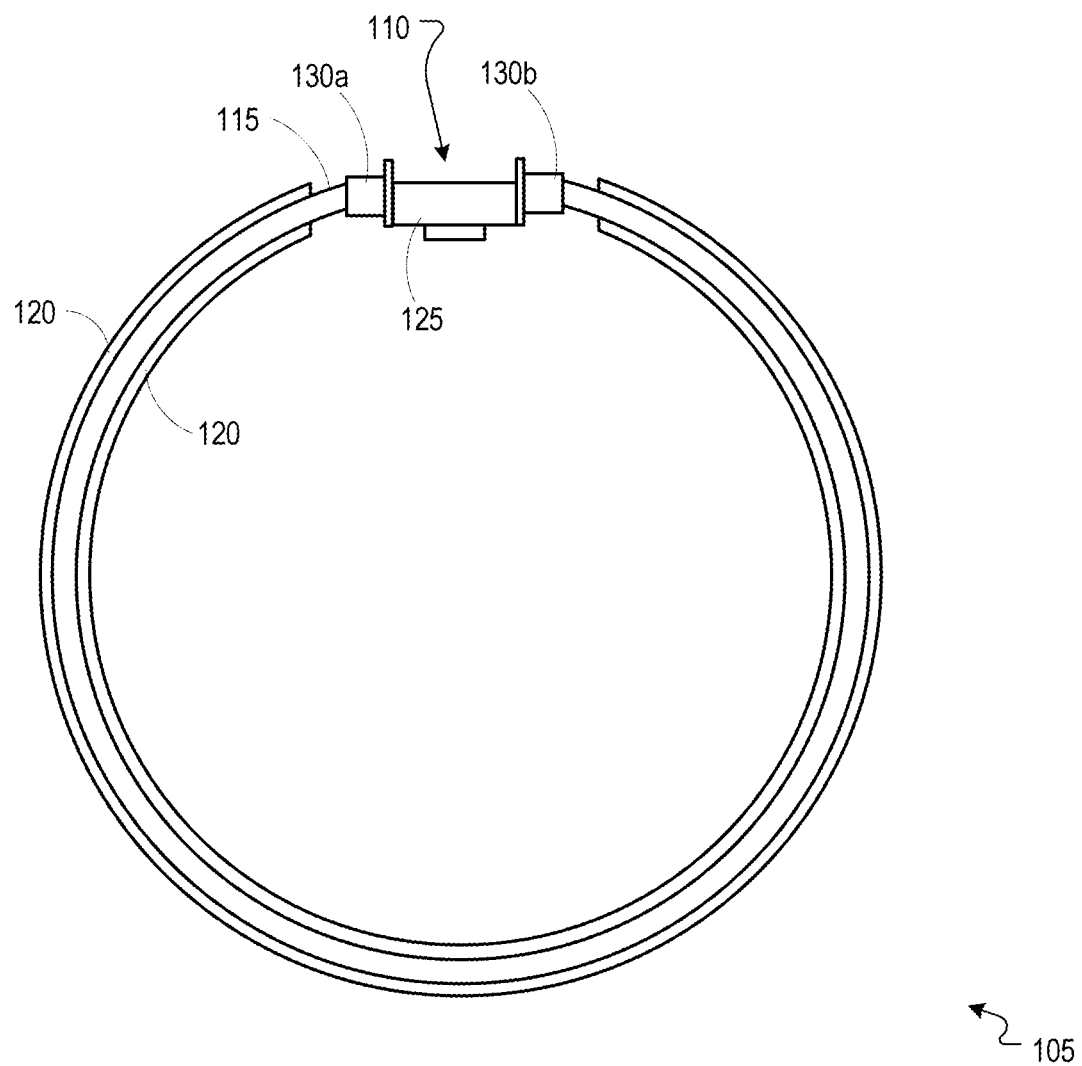
FIG. 1 shows an illustration of an assembled LED subassembly.

FIG. 1 shows an illustration of an assembled LED subassembly 105. In embodiments, the LED subassembly 105 may include an LED module 110, a light tube 115, and a lightguide 120. The LED module 110 may include a PCB 125 with a first LED 130a and a second LED 130b that are oriented axially into the light tube 115. This orientation maximizes the brightness and uniformity of an illumination of the light tube 115 by the LEDs 130a-b. The light tube 115 may be assembled directly into the lightguide 120 to allow for maximum light transmittance.

As can be seen in FIG. 1, the LEDs 130a-b are oriented directly in axial alignment. The lightguide 120 and light tube 115 may extend such that they form a round shape (e.g., the shape of a circle or oval). The lightguide 120 and light tube 115 do not have any sharp bends, thereby facilitating consistent and maximum light transmittance throughout the light tube 115. Light from each LED 130a-b is directed in an opposite direction from the other. It will be appreciated that a cross-sectional cut of the light tube 115 may be a circle, oval, square, rectangle, or any other shape. The light tube 115 may be hollow or solid and may be made from a material that allows light to travel through it (i.e., the light tube 115 may be made from a translucent material.

In embodiments, the light tube 115 may be flexible and the lightguide 120 may be rigid, such that the light tube 115 may be placed into a groove or gap of the lightguide 120.

As can be seen in FIG. 1, the LEDs 130a-b may be positioned such that they transmit light away from each other. The LEDs 130a-b may be positioned such that they transmit light in directions that are opposite (e.g., 180 degrees) or nearly opposite to each other.

In embodiments, the LED 130a may be near, touching, or attached to a first end of the light tube 115, and the LED 130a may be oriented such that a direction in which light is emitted from the LED 130a is toward the first end of the light tube 115. Likewise, the LED 130b may be near, touching, or attached to a second end of the light tube 115, and the LED 130b may be oriented such that a direction in which light is emitted from the LED 130b is toward the second end of the light tube 115.

Figure 2:
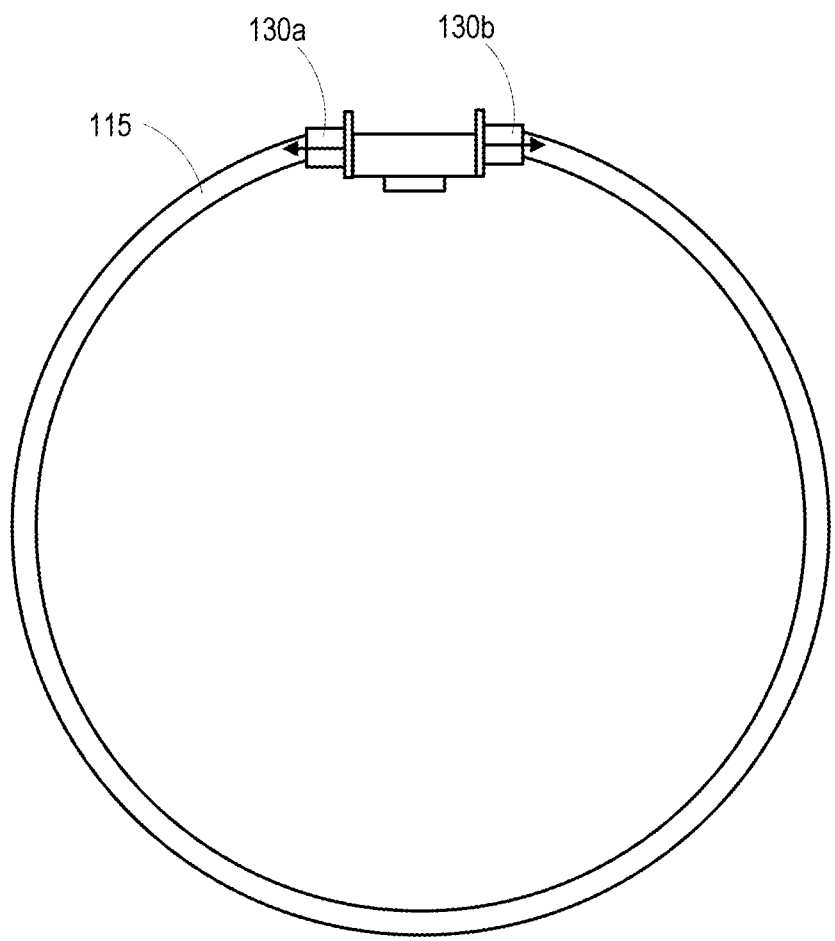
FIG. 2 is an illustration showing the directions that each of the LEDs output light into the light tube.

FIG. 2 is an illustration showing the directions that each of the LEDs 130a-b output light into the light tube 115. As shown by the arrows in FIG. 2, the LED 130a is facing a first direction, and light illuminates from the LED 130a into the light tube 115 toward said first direction, and the LED 130b is facing a second direction, and light illuminates from the LED 130b into the light tube 115 toward said second direction. As can be seen in FIG. 2, the first direction at which LED 130a is pointed is opposite to the second direction at which LED 130b is pointed.

Figure 3:
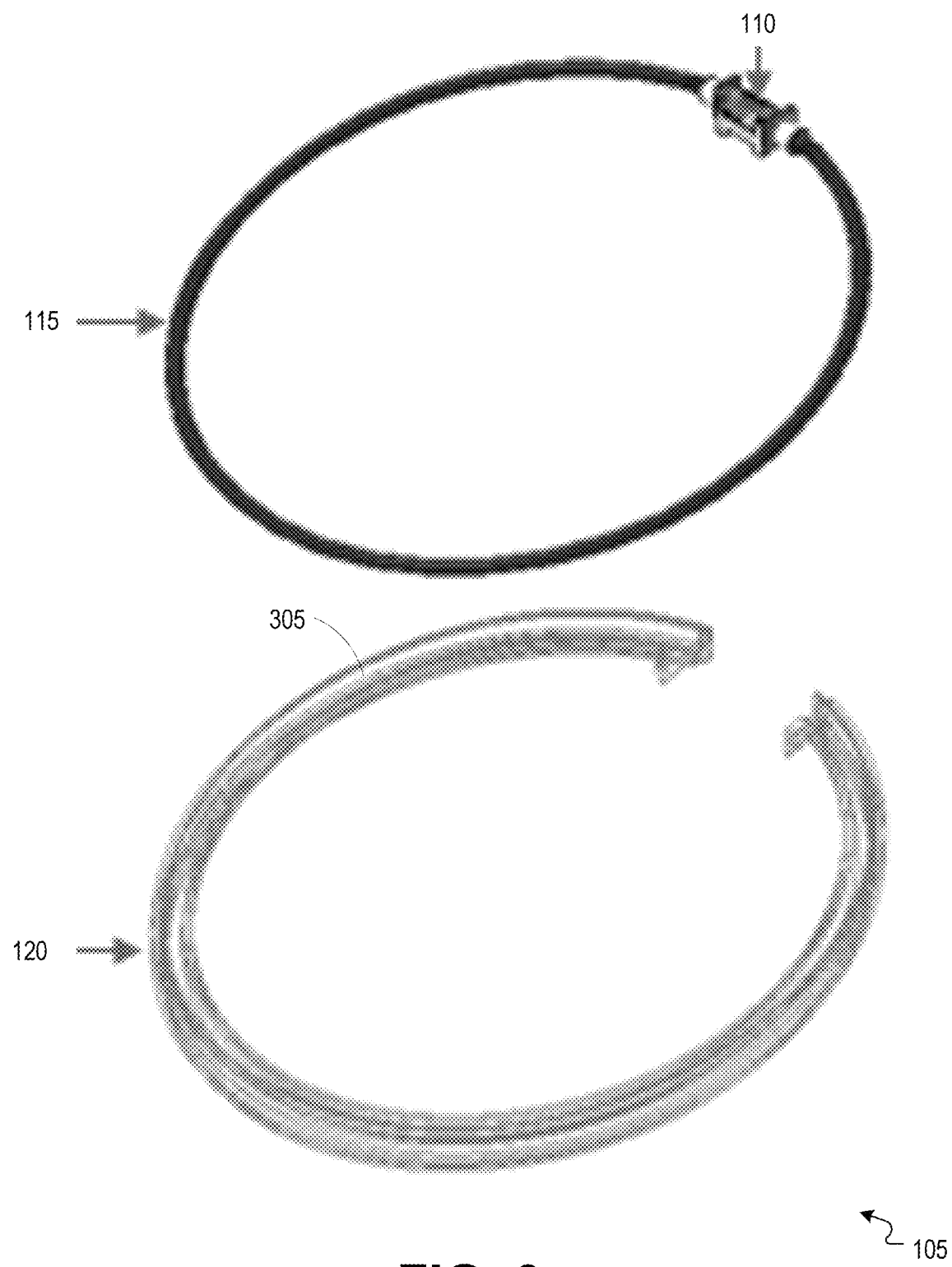
FIG. 3 is an exploded view of the LED subassembly.

FIG. 3 is an exploded view of the LED subassembly 105. As shown in FIG. 3, the lightguide 120 may have a slot 305 into which the light tube 115 may be inserted. The lightguide 120 may have a gap, wherein the LED module 110 may be positioned within said gap.

The light tube 115 may be thicker than the lightguide 120 is tall, such that when the light tube 115 is inserted into the lightguide 120, a significant portion (e.g., at least 40%, 50% 60%, etc. of the thickness of the light tube 115) of the light tube 115 rises above the upper portion of the lightguide 120.

Figure 4:
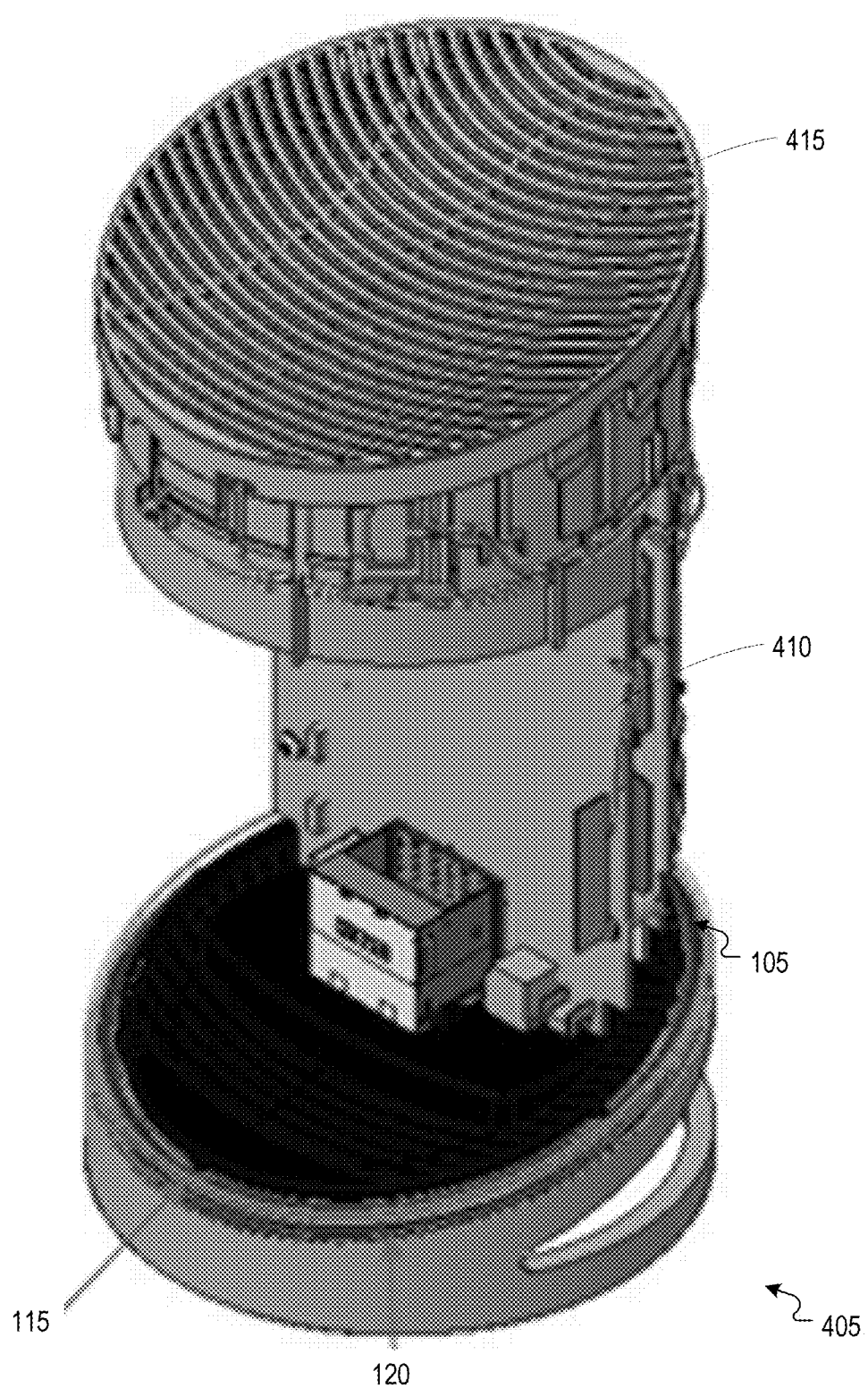
FIG. 4 shows a front isometric view of a device that includes the LED subassembly.

FIG. 4 shows a front isometric view of a device 405 that includes the LED subassembly 105. As shown in FIG. 4, the lightguide 120 may be attached to the device 405, and the light tube 115 may be inserted into the lightguide 120. As can be seen in FIG. 4, the device 405 may include one or more PCBs 410 that are oriented vertically for maximum thermal management. The device 405 may include one or more vent openings 415 above the PCBs 410 to facilitate optimal airflow.

Figure 5:
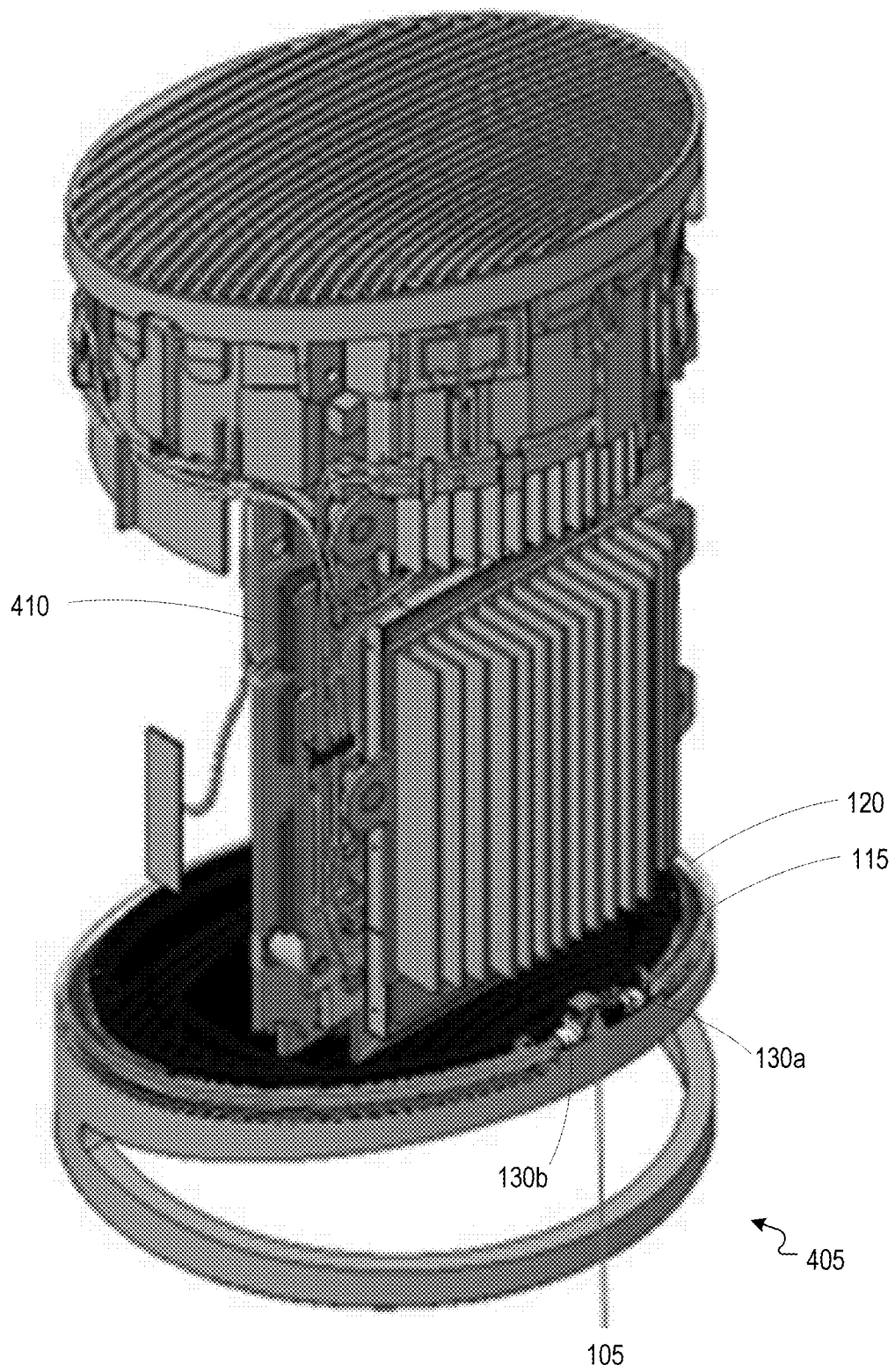
FIG. 5 shows a rear isometric view of the device.

FIG. 5 shows a rear isometric view of the device 405. As shown in FIG. 5, the lightguide 120 may be attached to the device 405, and the light tube 115 may be inserted into the lightguide 120. As can be seen in FIG. 5, the device 405 may include one or more PCBs 410 that are oriented vertically for maximum thermal management.

As shown in FIG. 5, the orientation of the LED subassembly 105 maximizes design flexibility by decoupling the LEDs 130*a-b* of FIG. 1 from the main PCBs 410. This configuration facilitates flexibility in the orientation of the PCBs 410, which then allows for proper airflow for thermal management.

The PCB of the LED subassembly 105 (e.g., PCB 125 of FIG. 1) may be connected to one or more PCBs 410 of the device 405.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

We claim:

1. A customer premise equipment device configured to allow airflow for thermal management comprising:
    one or more vertically oriented printed circuit boards;
    one or more vent openings located above the one or more vertically oriented printed circuit boards; and
    an LED (light emitting diode) subassembly comprising:
        a light tube that is extended into a rounded shape, the light tube comprising a first end and a second end;
        an LED module comprising a first printed circuit board, the first printed circuit board comprising:
            a first LED and a second LED oriented axially into a light tube, wherein:
                the first LED is positioned to transmit light in a first direction, the first direction being into the first end of the light tube; and
                the second LED is positioned to transmit light in a second direction, the second direction being into the second end of the light tube, wherein the second direction is away from the first direction; and
            the lightguide is extended into a rounded shape, wherein the lightguide comprises a groove, wherein the light tube is inserted into the groove of the lightguide, and wherein the light tube is flexible and the lightguide is rigid;
    wherein orientation of the LED subassembly to the one or more vertically oriented printed circuit boards decouples the first and second LEDs from the one or more vertically oriented printed circuit boards;
    wherein a thickness of the light tube is greater than a height of the lightguide such that a significant portion of the light tube rises above a top portion of the lightguide; and
    wherein the first printed circuit board is connected to at least one of the one or more vertically oriented printed circuit boards.

2. The customer premise equipment device of claim 1, wherein the second LED is positioned in axial alignment with the first LED.

3. The customer premise equipment device of claim 1, wherein the first direction and the second direction are opposite to each other.

4. The customer premise equipment device of claim 1, wherein the light tube is made from a translucent material.

* * * * *